(12) United States Patent
Tie et al.

(10) Patent No.: US 10,820,364 B2
(45) Date of Patent: *Oct. 27, 2020

(54) SYSTEM AND METHOD FOR UE-SPECIFIC OFFLOADING

(71) Applicant: Futurewei Technologies, Inc., Plano, TX (US)

(72) Inventors: Xiaolei Tie, Shanghai (CN); Carmela Cozzo, San Diego, CA (US); Peng Zhang, Shanghai (CN); Zongjie Wang, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 1 day.

This patent is subject to a terminal disclaimer.

(21) Appl. No.: 14/722,128

(22) Filed: May 26, 2015

(65) Prior Publication Data

US 2015/0373614 A1 Dec. 24, 2015

Related U.S. Application Data

(63) Continuation-in-part of application No. 14/659,260, filed on Mar. 16, 2015.
(Continued)

(51) Int. Cl.
*H04W 76/27* (2018.01)
*H04W 36/22* (2009.01)
(Continued)

(52) U.S. Cl.
CPC ........... *H04W 76/27* (2018.02); *H04W 36/22* (2013.01); *H04W 36/0058* (2018.08); *H04W 36/04* (2013.01)

(58) Field of Classification Search
CPC combination set(s) only.
See application file for complete search history.

(56) References Cited

U.S. PATENT DOCUMENTS 6,493,554 B1 12/2002 Kanerva et al.
9,155,013 B2 10/2015 Vargas Bautista et al.
(Continued)

FOREIGN PATENT DOCUMENTS

CN 102045865 A 5/2011
CN 102917392 A 2/2013
(Continued)

OTHER PUBLICATIONS

Kazmi M A et al., "Handover Protocols and Signaling Performance of a GSM Based Network for Distributed Coverage", Gateway to 21st Century Communications Village. IEEE VTS 50th Vehicular Technology Conference, Amsterdam, Netherlands Sep. 19-22, 1999, pp. 1180-1184.
(Continued)

*Primary Examiner* — Yemane Mesfin
*Assistant Examiner* — Mon Cheri S Davenport
(74) *Attorney, Agent, or Firm* — Slater Matsil, LLP

(57) ABSTRACT

An apparatus is configured to perform a method for user equipment (UE) offloading. The method includes receiving, at a network controller, a measurement report from a UE, the measurement report radio link measurement quantities of a serving cell and one or more candidate serving cells, the measurement quantities measured after interference cancellation or suppression. The method also includes, based in part on the measurement report from the UE, determining whether to offload the UE to a second cell among the one or more candidate serving cells.

39 Claims, 7 Drawing Sheets

Related U.S. Application Data

(60) Provisional application No. 61/955,606, filed on Mar. 19, 2014, provisional application No. 61/972,965, filed on Mar. 31, 2014.

(51) Int. Cl.
*H04W 36/04* (2009.01)
*H04W 36/00* (2009.01)

(56) References Cited

U.S. PATENT DOCUMENTS

| | | | |
|---|---|---|---|
| 9,179,363 B2* | 11/2015 | Siomina | H04W 28/0236 |
| 2008/0096569 A1 | 4/2008 | Khandekar et al. | |
| 2011/0128862 A1* | 6/2011 | Kallin | H04W 36/22 |
| | | | 370/245 |
| 2012/0188884 A1 | 7/2012 | Simonsson et al. | |
| 2012/0281544 A1* | 11/2012 | Anepu | H04B 7/0632 |
| | | | 370/241 |
| 2013/0322235 A1* | 12/2013 | Khoryaev | H04W 28/0289 |
| | | | 370/229 |
| 2014/0098670 A1* | 4/2014 | Choi | H04W 28/08 |
| | | | 370/235 |
| 2014/0155076 A1 | 6/2014 | Wang | |
| 2014/0200001 A1 | 7/2014 | Song et al. | |
| 2014/0206329 A1 | 7/2014 | Martin | |
| 2014/0370905 A1 | 12/2014 | Kim et al. | |
| 2015/0031369 A1 | 1/2015 | Gunnarsson et al. | |
| 2015/0156697 A1 | 6/2015 | Chen et al. | |
| 2016/0191200 A1* | 6/2016 | Wong | H04L 1/0026 |
| | | | 370/329 |

FOREIGN PATENT DOCUMENTS

| | | |
|---|---|---|
| CN | 103329458 A | 9/2013 |
| JP | 2013520881 A | 6/2013 |
| WO | 2011103476 A1 | 8/2011 |
| WO | 2013115696 A1 | 8/2013 |
| WO | WO 2013/115696 A1 | 8/2013 |
| WO | 2013140202 A1 | 9/2013 |
| WO | WO 2013/140202 A1 | 9/2013 |
| WO | 2014021759 A2 | 2/2014 |

OTHER PUBLICATIONS

Alcatel-Lucent et al. "Considerations on Cell Range Expansion", 3GPP TSG-RAN WG1, Meeting #76, R1-140143, Feb. 10-14, 2014, 3 pgs, Prague, Czech Republic.
Huawei et al. "Considerations on CIO Adaptation", 3GPP TSG-RAN WG1 Meeting #76bis, R1-141672, Mar. 31-Apr. 4, 2014, 5 pgs., Shenzhen, China.
Huawei et al., "Further Discussion on Offloading and CIO Adaptation in Hetnet", 3GPP TSG-RAN WG1 Meeting #77, R1-142552, May 19-23, 2014, 5 pgs, Seoul, Korea.

* cited by examiner

SYSTEM AND METHOD FOR UE-SPECIFIC OFFLOADING

CROSS-REFERENCE TO RELATED APPLICATION(S) AND CLAIM OF PRIORITY

This application is a continuation-in-part of U.S. Nonprovisional patent application Ser. No. 14/659,260 filed Mar. 16, 2015, entitled "SYSTEM AND METHOD FOR UE-SPECIFIC OFFLOADING", which claims priority to U.S. Provisional Patent Application No. 61/955,606, filed Mar. 19, 2014, entitled "UE-SPECIFIC OFFLOADING", and U.S. Provisional Patent Application No. 61/972,965, filed Mar. 31, 2014, entitled "ADAPTIVE CIO AND UE-SPECIFIC OFFLOADING", all of which are hereby incorporated by reference into this application as if fully set forth herein.

TECHNICAL FIELD

The present disclosure relates generally to wireless communication networks including heterogeneous networks and universal mobile telecommunications system (UMTS) user equipment (UE), and more particularly, to systems and methods for offloading and cell individual offset (CIO) adaption.

BACKGROUND

The deployment of heterogeneous networks (Hetnets), which include a mixed deployment of high power NodeBs (macro cells) and low power nodes (LPNs), aims at increasing network capacity and coverage. Load imbalance is a common issue in network deployment, especially for Hetnets. For example, the LPN generally transmits with low power, causing the coverage of the LPN to be limited. Additionally, the LPN cannot always be deployed in the center of a hotspot area. These two factors can lead to a lightly loaded LPN and an overloaded macro cell. Load balancing techniques can be used to improve network capacity and user experience. However, many of the load balancing techniques are less than optimal.

SUMMARY

According to one embodiment, there is provided a method for user equipment (UE) offloading. The method includes receiving, at a network controller, a measurement report from a UE, the measurement report radio link measurement quantities of a serving cell and one or more candidate serving cells, the measurement quantities measured after interference cancellation or suppression. The method also includes, based in part on the measurement report from the UE, determining whether to offload the UE to a second cell among the one or more candidate serving cells.

According to another embodiment, there is provided a method for UE offloading at a UE. The method includes performing, at the UE, one or more measurements associated with radio link performance of a serving cell and one or more candidate serving cells. The method also includes transmitting, by the UE, a measurement report to a network controller, the measurement report comprising the one or more measurements associated with the radio link performance of the serving cell and the one or more candidate serving cells. The measurement report is configured to be used at the network controller to determine whether to offload the UE to a second cell among the one or more candidate serving cells.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 7B, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Embodiments of this disclosure are directed to the offloading of UEs from one cell to another cell that generally has a lower load. The decision to offload is based on the traffic load of the serving cell and the candidate serving cells, and the UE link level performance difference before and after offloading. The traffic load may be known by the network. The UE link level performance can be closely related to the UE receiver capability and radio link conditions. The UE reports to the network the radio link conditions from the current serving cell and from the neighbor candidate-serving cell(s). Based on the traffic load and UE reports of the radio link conditions, the network offloads the UE to a new cell by setting a UE-specific cell individual offset (CIO) or directly triggering the offloading procedure. While the disclosed embodiments are described in conjunction with heterogeneous networks (i.e., networks having NodeBs with different transmit powers), it will be understood that the disclosed embodiments are also applicable to homogeneous networks (i.e., networks having NodeBs with substantially the same transmit powers).

Figure 1:
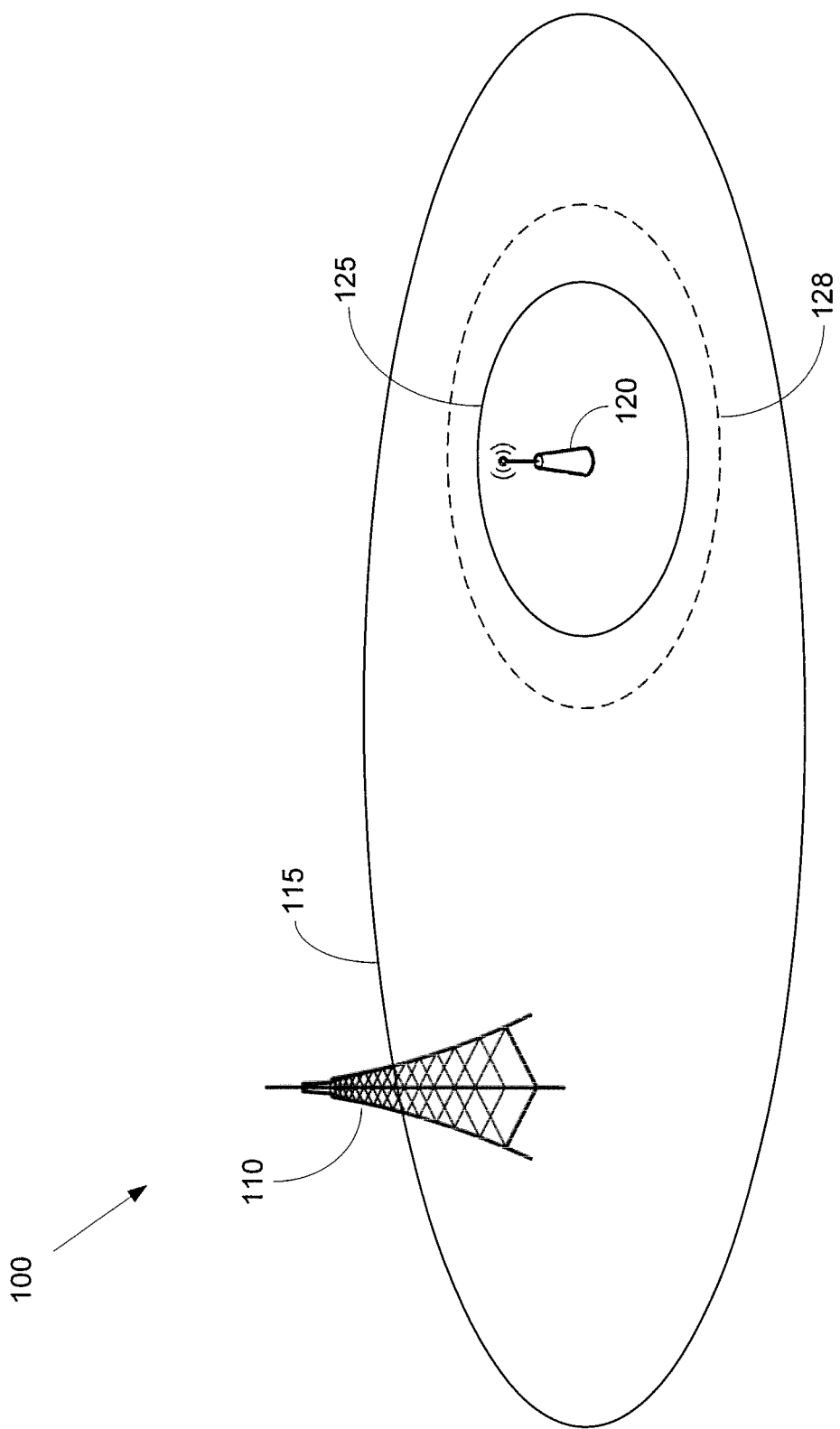
FIG. 1 illustrates an example heterogeneous network (Hetnet)

FIG. 1 illustrates an example heterogeneous network (Hetnet) 100. A Hetnet is a mixed deployment of high power NodeBs (macro cells) and low power nodes (LPNs) configured to increase the network capacity and coverage. As shown in FIG. 1, the Hetnet 100 includes a macro NodeB 110 serving a coverage area 115, and a LPN 120 serving a coverage area 125. In Hetnets, UEs can be offloaded from the macro cell to the LPN and can enjoy higher data rates. System capacity and coverage gains come primarily from the enhanced scheduling opportunities provided by the LPN. Therefore, offloading more UEs to be served by a LPN can be important in Hetnet deployments.

In Hetnets, the difference in transmit power between a macro NodeB and a LPN causes different coverage areas for the uplink (UL) and the downlink (DL); this is generally referred to as UL-DL imbalance. The downlink coverage is determined by the transmit power of each node, and high transmit power nodes cover larger areas than low transmit power nodes. For example, in FIG. 1, the coverage area 115 of the macro NodeB 110 is larger than the coverage area 125 of the LPN 120. Serving cell selection is based on the downlink received signal strength. If the Cell Individual Offset (CIO) of the serving cell change is configured at 0 dB, event 1D for cell change (described below) is reported when the UE is positioned where the downlink signal powers from the macro NodeB and the LPN are the same. At that position, the uplink signal received at the macro NodeB is much weaker than the signal received at the LPN, or equivalently the path loss from the UE to the macro NodeB is larger than the path loss from the UE to the LPN. Thus, the UE position with equal uplink path loss and the UE position with equal downlink received power are different; the region between such positions is referred to as the imbalance region.

Cell range expansion (CRE) is a technique to expand the coverage area of LPNs and impacts the offloading operation. With CRE, the CIO at the LPN is set to a value higher than zero. This expands the coverage area of the LPN, as indicated by the expanded coverage area 128 in FIG. 1. Then, with CRE in use, in the area where the UE originally was served by the macro cell (e.g., in FIG. 1, the area outside the coverage area 125 but inside the expanded coverage area 128), the UE will instead be offloaded to the LPN. This area is referred to as the CRE area. In order to offload more UEs to be served by the LPN, the CRE area should be enlarged. One typical technique to enlarge the CRE area includes configuring a larger handover biasing parameter.

As defined in 3GPP 25.331, the serving cell change procedure is initiated by a defined event 1D. An event 1D will be triggered for one UE when the following condition is satisfied:

$$10 \cdot \text{Log } M_{NotBest} CIO_{NotBest} \geq 10 \cdot \text{Log } M_{Best} + CIO_{Best} + H_{1d}/2, \quad (1)$$

where $M_{NotBest}$ is the measurement result of a cell which is not the serving cell of the UE, $CIO_{NotBest}$ is the cell individual offset of this specified cell, $M_{Best}$ is the measurement result of the serving cell of the UE, $CIO_{Best}$ is the cell individual offset of the serving cell of the UE, and $H_{1d}$ is the hysteresis parameter for the event 1D.

The CIO parameter can be configured by radio resource control (RRC) signaling from the radio network controller (RNC) or by system information block (SIB) information from the serving NodeB. One individual CIO is configured for one individual cell ($CIO_{Best}$). Once the event 1D is triggered, the UE sends a measurement report that includes the measurement results to the RNC. Based on this measurement report (related to $M_{Best}$), the RNC determines whether the UE should hand over (be offloaded) to the specified NotBest cell that satisfies equation (1).

According to the serving cell change procedure described above, it can be seen that in UMTS the range expansion can be achieved by using a larger $CIO_{NotBest}$ parameter. In some Hetnet deployments, the network can use a larger CIO parameter for the LPN cell (identified as $CIO_{LPN}$), in which case the UE will be more inclined to hand over to the LPN (in high-speed downlink packet access (HSDPA), the handover is called serving cell change). Therefore, more UEs will be offloaded to the LPN, which can improve the system capacity and coverage performance for Hetnets.

By applying a large CIO parameter to offload the UE to an unloaded or lightly loaded cell, the CRE technique can provide a benefit to the network capacity and coverage. However, the CRE technique may not improve the performance of the offloaded UE. There are a number of factors impacting the UE performance when offloading is applied. One factor is an increase in scheduling resources or opportunities from the new NodeB if the new serving cell is unloaded or lightly loaded compared with the previous cell. Another factor is radio link degradation. That is, the offloaded UEs may suffer from a worse serving link compared with the previous serving link. This can be due to a strong interfering signal from the neighboring cell (which can be the previous serving cell before offloading).

Figure 2:
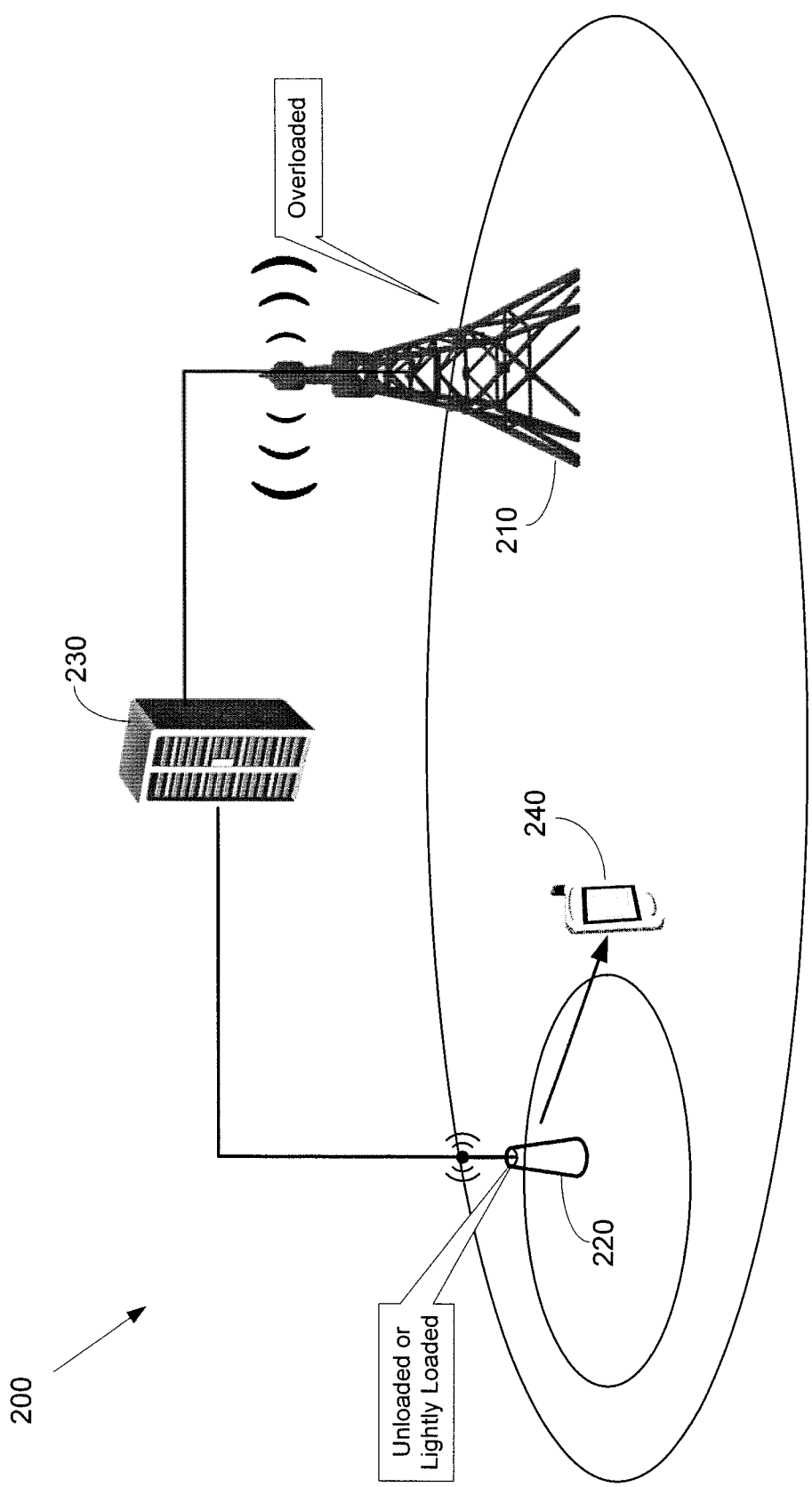
FIG. 2 illustrates another example Hetnet.

An example is shown in FIG. 2. FIG. 2 illustrates another example Hetnet 200 that include a macro NodeB 210 and a LPN 220 communicatively coupled to a RNC 230. The Hetnet 200 also includes one or more UEs represented by the UE 240. As shown in FIG. 2, the macro NodeB 210 is overloaded and the LPN 220 is unloaded or lightly loaded. This can be a typical scenario in Hetnet deployments. In this scenario, before offloading, the UE 240 experiences a better downlink radio link from the serving cell (the macro NodeB 210); however, the UE 240 is rarely scheduled due to the limited scheduling resources on the macro NodeB 210. After offloading, the offloaded UE 240 can be scheduled with more scheduling transmission time intervals (TTIs); however, the data that could be conveyed on each scheduled TTI may be degraded due to a worse radio link from the new serving cell (the LPN 220).

The supported data rate in each TTI (or more generally, the link level performance of the UE 240) is impacted not only by the radio link condition but also by the receiver capabilities of the UE 240. A UE with more powerful receiver processing, such as found in an interference cancellation receiver, can support larger data rates compared with less powerful receivers under the same radio link condition.

Depending on the presence of other UEs with different receivers in the Hetnet 200, the offloading operation of the UE 240 may have a different impact on the UE 240 and overall system performance. Hence, it is observed that the cell-specific offloading/CIO adaptation solution does not always guarantee the best performance in a realistic deployment.

The decision to offload a specific UE can be based on the load of the current serving cell and the candidate new serving cells, and the link level performance difference before and after offloading. The load is known by the network. The link level performance is closely related to the UE receiver capability and radio link condition, which, in most legacy networks, is only known by the UE. In order to improve the offloading decision, the network should also have knowledge of the radio link conditions in the candidate neighbor serving cells. This is not supported in current networks.

To address these issues, embodiments of this disclosure provide methods and systems to allow the network to perform UE-specific offloading and CIO adaptation. In the disclosed embodiments, the link level performance difference before offloading (where the UE is served in the current serving cell) and after offloading (where the UE is served in one of the candidate neighbor serving cells) can be indicated to the network side.

To achieve this, embodiments of this disclosure define signaling to indicate the link level performance difference if offloading would be applied to the UE. In some embodiments, the signaling can include a new measurement report that indicates the link level performance of the serving cell and candidate neighbor serving cells. In some embodiments, the measurement report includes legacy measurement quantities, such as received signal code power (RSCP) and received signal strength indicator (RSCP/RSSI). In addition to (or instead of) legacy measurement quantities (such as RSCP and RSCP/RSSI), the measurement report can include metrics that reflect the link level performance difference. One example metric, CQI_candidate, is described below.

Given the above measurements, the network can decide whether to offload the UE based on one or more of the following aspects:

Link level evaluation: The UE position could be obtained from the legacy RSCP measurements. The link quality difference after offloading can be evaluated from the difference between the CQIs of the serving cell and neighbor cells.

Scheduling resource gain evaluation: The resource usage is known by the RNC or other network entity. The network can evaluate how much gain in scheduling resources could be obtained for the UE if the UE is offloaded to the new cell.

Once the decision to offload is made, the offloading procedure can be performed by (1) directly triggering the handover procedure by using legacy RRC signaling, (2) configuring a UE-specific CIO on the UE through legacy RRC signaling, or (3) another suitable method.

The disclosed embodiments feature a new measurement of radio link level performance, CQI_candidate, from candidate neighbor cells; a method to configure the UE to perform measurements on the candidate neighbor cell set, and one or more triggering events for the new measurement report, as described in greater detail below. The network decision to offload can be based on both the legacy measurements and the new measurements.

Measurement Report to Indicate Link Level Performance

In some embodiments, a new measurement of radio link level performance is defined and configured on the UE side. Using the new measurement, measurement quantities reflecting the link level performance of the data channel can be evaluated for the serving cell and one or more candidate neighbor serving cells. A new measurement report can be used to report the new measurement. The measurement report can include measurements that reflect the difference between link level performances in the serving cell and the candidate neighbor serving cells. The measurement report can also optionally include legacy measurements, such as RSCP, RSCP/RSSI, and energy per chip over noise (Ec/No).

Figure 3:
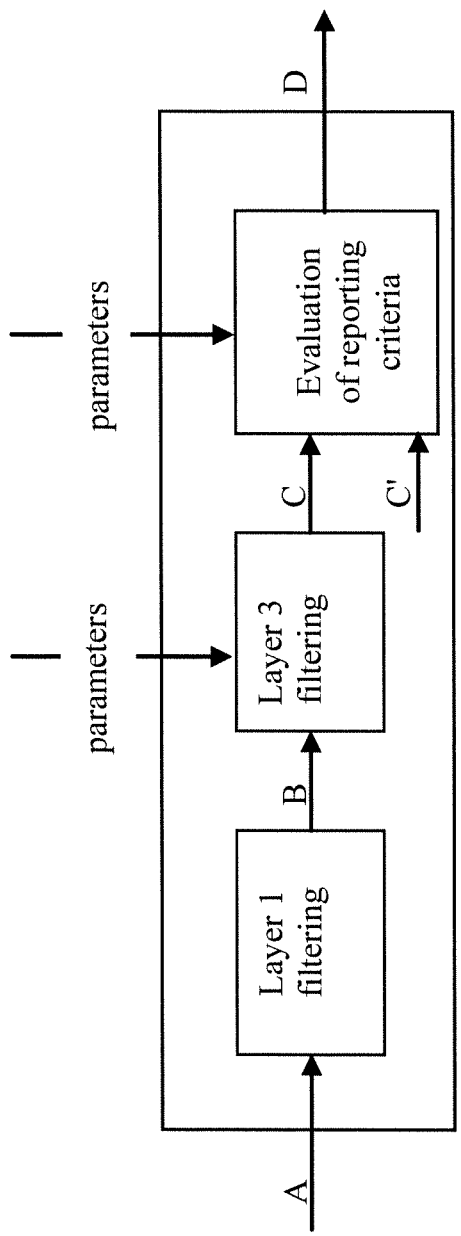
FIG. 3 illustrates the measurement model as in FIG. 7 in 3GPP TS 25.302.

The new measurement, which is referred to as CQI_candidate, can be defined as a Channel Quality Indicator (CQI) value from a candidate neighbor cell. The definition of CQI_candidate is similar to the definition in Section 6A.2 in 3GPP TS 25.214. For example, Section 6A.2 states, "Based on an unrestricted observation interval, the UE shall report the highest tabulated CQI value for which a single HS-DSCH sub-frame formatted with the transport block size, number of HS-PDSCH codes and modulation corresponding to the reported or lower CQI value could be received with a transport block error probability not exceeding 0.1 in a 3-slot reference period ending 1 slot before the start of the first slot in which the reported CQI value is transmitted." In this disclosure, instead of being an estimation of CQI for a serving cell (as defined in Section 6A.2), CQI_candidate is an estimate of CQI for a non-serving cell (i.e., the candidate neighbor cell). This layer measurement is filtered according to the standardized model illustrated in FIG. 7 in Section 9.1 of 3GPP TS 25.302, which is shown in FIG. 3 of this disclosure. After layer 3 filtering, a long term CQI estimate for the candidate neighbor cell is obtained. The long term CQI estimate is referred to as LCQI_candidate. The measurement model is already defined in Section 9.1 of 3GPP TS 25.302 and can be applied here using the measurements performed on the non-serving candidate neighbor cell links.

The legacy CQI from the serving cell is also filtered using the same filtering technique as for the CQI from the candidate neighbor cell. After layer 3 filtering, a long term CQI estimate is obtained. The long term CQI estimate for the serving cell is referred to as LCQI_serving.

In some embodiments, the UE sends the filtered values, LCQI_serving and LCQI_candidate, to the RNC when a measurement event is triggered. The RNC estimates the UE link level performance difference when the UE is served by the current serving cell and when the UE could be served by the candidate neighbor cell. One way is to calculate the difference between the two long term CQIs and compare the difference to a predefined threshold.

In some embodiments, the UE performs the filtering of the long term CQI estimates from the serving and neighbor cells, and estimates the difference between the two CQI values. Then the UE sends the difference value to the RNC.

A list of candidate neighbor cells can be configured for the new defined measurement CQI_candidate. The intent of configuring the candidate neighbor cell list is to reduce the overhead on the UE. By using the list, the UE can avoid unnecessary post-IC measurement for non-candidate cells. Only the candidate cells which the UE can access and may hand over to are configured as a member of the candidate list. The candidate neighbor cell list can be restricted to a set of neighbor cells that are lightly loaded and are good candidate cells for offloading. As an example, in some Hetnet systems, only the LPNs covered by the macro cell can be configured for measuring CQI_candidate. As another example, in some Hetnet systems, only CQI_candidate from the strongest neighbor cell is measured. As yet another example, in some homogeneous networks, a six-sector deployment is used on some NodeBs. In this scenario, more UEs locate in the edge area between two neighboring sectors on the same NodeB. For these UEs, the RNC can include the neighbor cells of the current serving cell into the candidate neighbor cell list, and use RRC signaling to request the UE to measure the post-IC measurements (e.g., long term CQI) of the cells in the candidate neighbor cell list.

As an example, when the RNC uses a measurement control message to configure a UE to do post-IC measurements (e.g., long term CQI), an information element (IE) is used to indicate a neighbor cell list to the UE. The cells in the neighbor cell list are the candidate cells that can be accessed by the UE. One example is the neighbor cells on the same NodeB and the LPN cells covered by the serving cell.

Once measurements have been taken, the measurements can be reported to the network (e.g., the RNC) in a measurement report as described herein. The measurement report can be transmitted in response to different occurrences. In some embodiments, the measurement report can be transmitted in response to an occurrence of a predetermined event or trigger. In other embodiments, the measurement report can be transmitted according to a predetermined schedule (i.e., periodically).

In embodiments where the measurement report is transmitted in response to a predetermined event or trigger, the trigger can be based on the following equation:

$$f_1(M_{candidate}) - f_2(M_{serving}) \geq f_3(z1, z2, \ldots) \qquad (1)$$

where $M_{candidate}$ is the measurement result for a candidate cell which is not the current serving cell, $M_{serving}$ is the measurement result for the current serving cell, $f_1(M_{candidate})$ and $f_2(M_{serving})$ are functions of $M_{candidate}$ and $M_{serving}$, respectively, $f_3(z1, z2, \ldots)$ is function of $z1$, $z2, \ldots$, depending on the number of variables, and $z1$, $z2, \ldots$ are different parameters that can change depending on the embodiment, as described in the examples below.

In a first example, Equation 1 can be represented by the following equation:

$$10 \cdot \log M_{candidate} \geq 10 \cdot \log M_{serving} - \text{Threshold1}, \qquad (2)$$

where $M_{candidate}$ is the measurement result for the candidate cell, $M_{serving}$ is the measurement result for the current serving cell, and Threshold1 is a threshold parameter or value configured by the network.

The measurements $M_{candidate}$ and $M_{serving}$ reflect the link level performance for the related data channels. Hence, by comparing $M_{candidate}$ and $M_{serving}$, the link level performance difference can be evaluated if the UE is assumed to be offloaded from the serving cell to the candidate cell.

When the difference between $M_{candidate}$ and $M_{serving}$ is below the threshold Threshold1, it can be assumed that the link level performance will not be substantially degraded after the UE is offloaded from the serving cell to the candidate cell. In this case, the UE could be offloaded to the candidate cell to provide more scheduling resources. Hence, once Equation 2 is fulfilled for a specified duration (referred to as Time to Trigger), the measurements are sent by the UE to the RNC in a measurement report.

In a second example, Equation 1 can be represented by the following equation:

$$10 \cdot \log M_{candidate} + CIO_{candidate} \geq 10 \cdot \log M_{Serving} + CIO_{serving} + H_{1d}/2, \qquad (3)$$

where $M_{candidate}$ is the measurement result for the candidate cell, $CIO_{candidate}$ is the long term CQI individual offset (LCIO) of the candidate cell, $M_{serving}$ is the measurement result for the current serving cell; $CIO_{Serving}$ is the long term CIO of the current serving cell, and $H_{1d}$ is a hysteresis parameter for the event.

The measurements $M_{candidate}$ and $M_{serving}$ reflect the link level performance for the related data channels. Hence, by comparing $M_{candidate}$ and $M_{serving}$, the link level performance difference can be evaluated if the UE is assumed to be offloaded from the serving cell to the candidate cell.

When the difference between $M_{serving}$ and $M_{candidate}$ is below a predetermined threshold, it can be assumed that the link level performance will not be substantially degraded after the UE is offloaded from the serving cell to the candidate cell. In this case, the UE could be offloaded to the candidate cell to provide more scheduling resources. Hence, once Equation 3 is fulfilled for a specified duration (e.g., Time to Trigger), the measurements are sent by the UE to the RNC in a measurement report.

As stated earlier, in some embodiments, the measurement report can be transmitted according to a predetermined periodical reporting schedule. A reporting interval T can be configured and provided to the UE in a measurement control message. Once the UE is aware of the reporting interval T, the UE can send the measurement report to the RNC periodically according to the reporting interval T. In some embodiments, periodic reporting can be initiated after event-triggered reporting. For example, in some cases after event-triggered reporting occurs, the UE may be located at a cell edge. For a cell-edge UE, the channel conditions from the serving cell and candidate cells might change again, and the conditions for a cell change could be met. In such a scenario, periodic reporting may help the RNC with the decision to offload.

Figure 4:
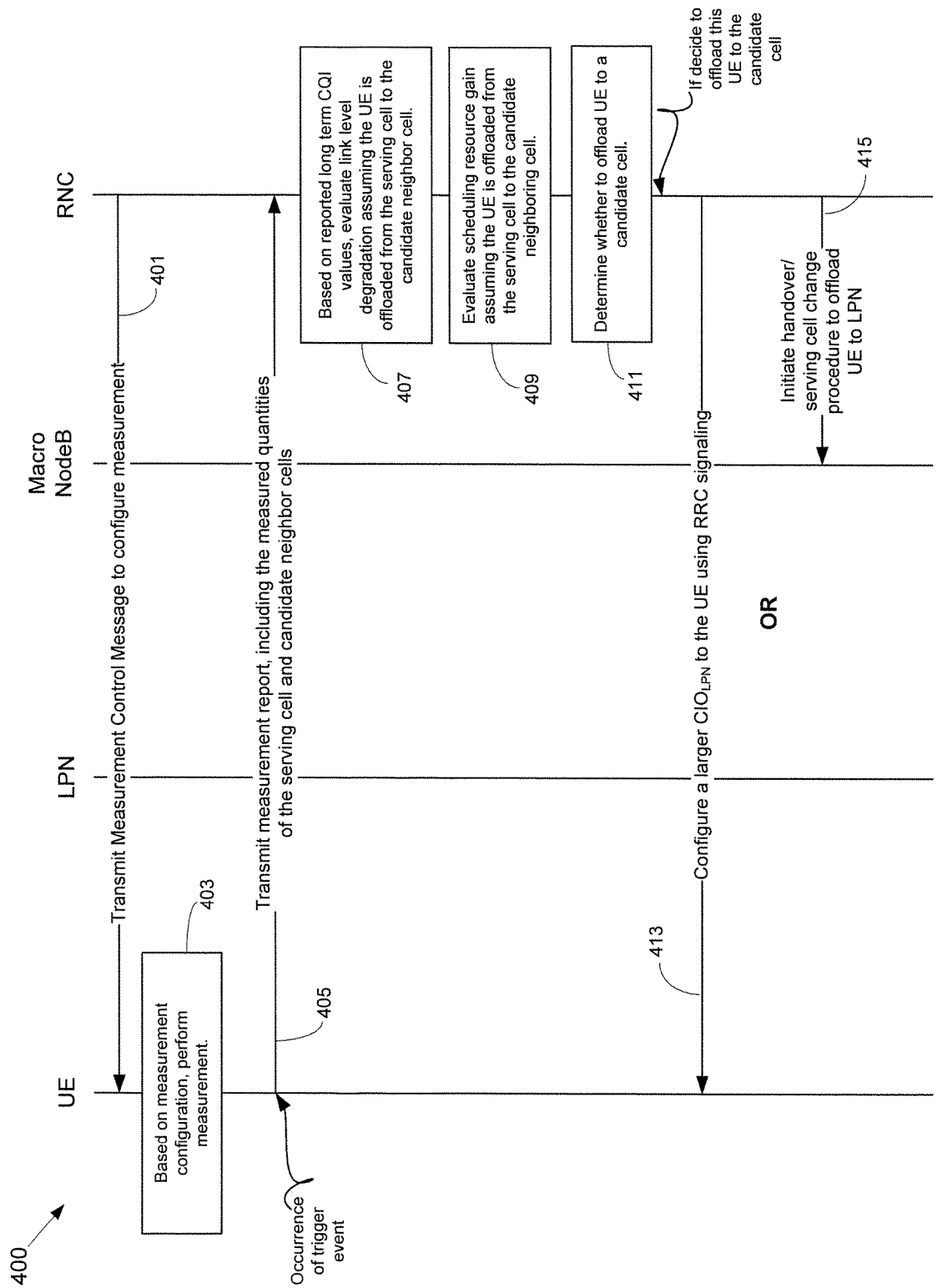
FIG. 4 illustrates a workflow diagram of an example process for measurement reporting and UE-specific CIO adaptation and offloading according to this disclosure.

FIG. 4 illustrates a workflow diagram of an example process for measurement reporting and UE-specific CIO adaptation and offloading according to this disclosure. The process 400 may be performed in the Hetnet 100, Hetnet 200, or any other suitable system.

At operation 401, the RNC transmits a measurement control message to the UE to configure one or more measurements to be performed by the UE that reflect the difference between link level performances in the serving cell and the candidate neighbor serving cells. The one or more measurements can include one or more CQI_candidate values, long term CQI values, LCQI_candidate values, filtered CQI values, other suitable measurement values, or a combination of two or more of these.

At operation 403, based on the measurement configuration received from the RNC, the UE performs the one or more measurements.

At operation 405, after an occurrence of a trigger event, the UE transmits a measurement report to the RNC. The trigger event can be one of the trigger events described above. The measurement report can include the measurements taken in operation 403, including measured quantities of the serving cell and one or more candidate neighbor cells. If legacy measurement quantities are also included in the measurement report, the RNC can estimate the position of the UE between the original serving cell and the target candidate offloading cell. Hence the geometry difference can also be evaluated and a proper CIO value can be chosen for offloading for the UE.

Once the new measurement report is received, the RNC evaluates the measurement data in the measurement report and determines whether to offload the UE. This can include the following operations 407, 409, and 411.

At operation 407, based on the LCQI_candidate values reported in the measurement report, the RNC performs a link level degradation evaluation. In the evaluation, the RNC assumes the UE is offloaded from the serving cell to the candidate neighbor cell, and then compares the reported LCQI_candidate values. Based on the comparison, the RNC can evaluate how much link level performance difference will be introduced if the UE's serving cell is changed to one of the candidate cells.

For example, when the difference between the LCQI_candidate values is below a predetermined threshold (Threshold2), the RNC determines that the link level performance loss will be within a specified range or percentage after the UE is offloaded to the corresponding candidate cell. As a particular example, the link level performance can be measured or defined by the transport block size (TBS), which can be conveyed upon the data channel between the investigated cell and the UE assuming that some specified $BLER_{target}$ (a target block error rate that is predetermined at the RNC) is achieved. By evaluating the link level degradation, the RNC can estimate how much link level performance loss can be expected assuming the UE is offloaded to the candidate cell in the reported neighbor cell list.

At operation 409, the RNC evaluates how much (or how many) scheduling resources can be gained once the UE is offloaded from the overloaded serving cell to a lightly loaded candidate neighbor cell. The loading status on each NodeB (including both macro NodeBs and LPNs) is known by the corresponding RNC in the network. In addition to the loading status, the scheduling principle on each NodeB is usually known by the RNC. Based on this information, the RNC can evaluate how much gain on scheduling resources could be obtained for the UE if the UE were offloaded to the candidate cell.

As an example, the scheduling resources for high-speed downlink packet access (HSDPA) can be measured by the number of available TTIs that would be scheduled or allocated to the UE. Alternatively, the average number of additional high speed-physical downlink shared channel (HS-PDSCH) code resources available after offloading can be another consideration in the evaluation of the gain on scheduling resources. It will be understood that other methods can be used for scheduling resources within the scope of this disclosure.

The RNC can perform the evaluations of operations 407 and 409 on each candidate cell in the cell list in the received measurement report.

At operation 411, the RNC decides whether to offload the UE to a candidate cell. Based on the evaluation results from operation 407 and operation 409, the RNC knows from which candidate neighbor cell(s) the UE can obtain sufficient scheduling resources to overcome the link level performance degradation due to strong interference after offloading. Hence, the RNC can make the decision to offload the UE and then select a candidate cell as the offloading target cell. In making the decision to offload the UE, the RNC can consider the objective of improving the overall network capacity by offloading. The RNC can also consider the objective of improving the throughput of the UE.

The order of operations 407, 409, and 411 can be rearranged according to the specific implementation. As an example, two or more of the operations can be performed substantially concurrently by the RNC.

If the RNC decides to offload the UE to the candidate cell, either operation 413 or operation 415 is performed. Stated differently, either the CIO adaptation signaling is triggered, meaning that a new CIO is sent to the LPN, or the offloading procedure is initiated directly.

At operation 413, the RNC configures a UE-specific CIO parameter for the UE, and then transmits the UE-specific CIO parameter to the UE using RRC signaling. The RNC uses RRC signaling to configure the UE-specific CIO parameter for a target LPN to ensure that the UE will be more likely to be offloaded to the LPN.

Alternatively, at operation 415, the RNC initiates a handover/serving cell change procedure at the macro NodeB to offload the UE to the target candidate offloading cell.

In some embodiments, as an alternative to the CQI_candidate measurement described above, the measurement for link level performance differences can be $\Delta LCQI_{candidate}$, which is defined according to the following:

$$\Delta LCQI_{candidate} = LCOI_{candidate} - LCQI_{serving}, \quad (4)$$

where $LCQI_{candidate}$ is the long term CQI for the candidate neighbor cell (as described above), which is configured by the corresponding measurement control message; and $LCQI_{serving}$ is the long term CQI for the serving cell. The measurement $\Delta LCQI_{candidate}$ can be determined for each candidate cell. As an alternative definition, the measurement $\Delta LCQI_{candidate}$ can be also defined according to the following:

$$\Delta LCQI_{candidate} = LCQI_{serving} - LCQI_{candidate} \quad (5)$$

In embodiments where the measurement is $\Delta LCQI_{candidate}$ the measurement report transmitted by the UE to the RNC can include a list of $\Delta LCQI_{candidate}$ values corresponding to the list of candidate cells, which is configured by corresponding measurement control messages. The measurement report can also optionally include legacy measurements, such as RSCP, RSCP/RSSI and Ec/No.

Figure 5:
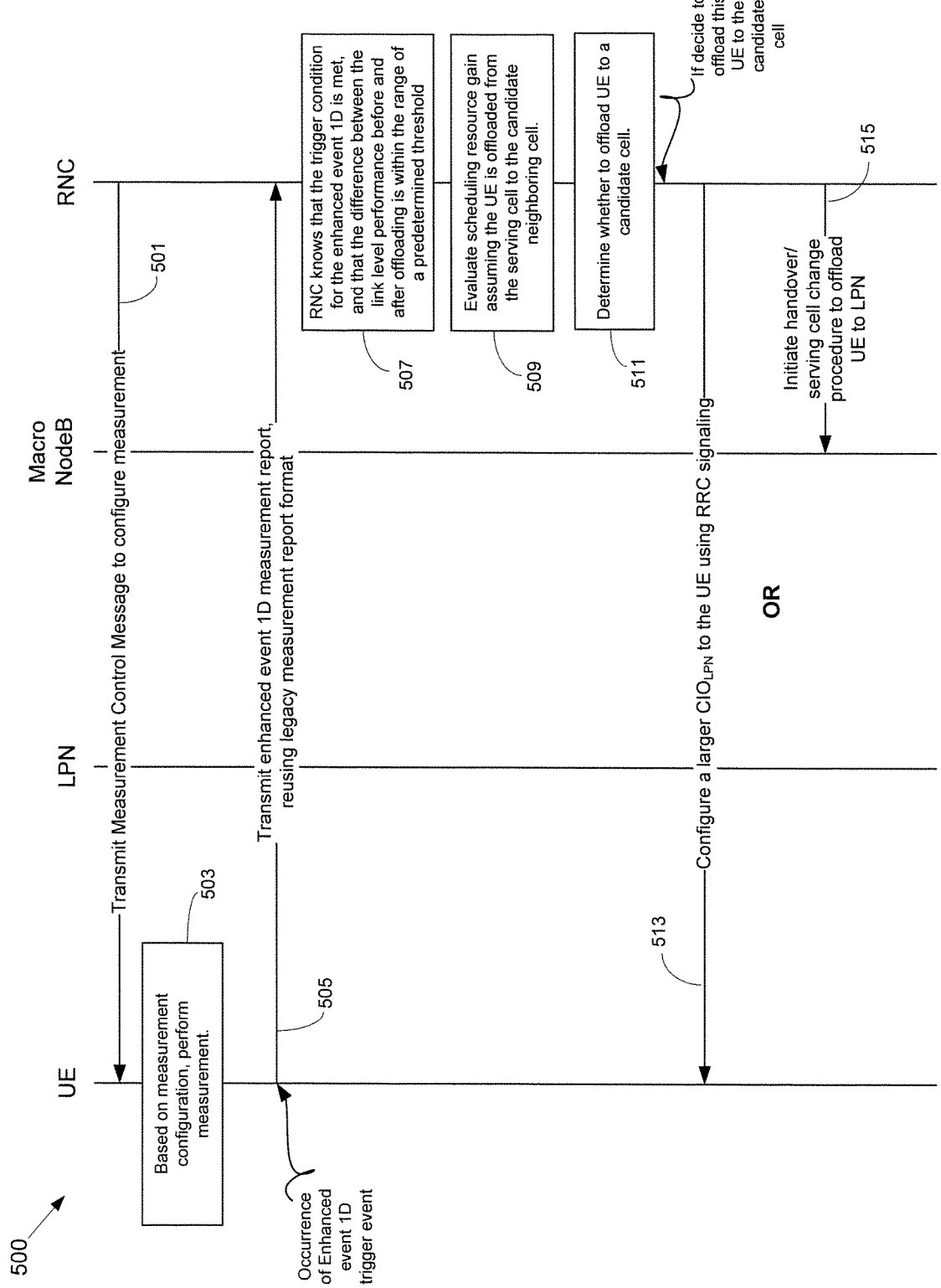
FIG. 5 illustrates a workflow diagram of another example process for measurement reporting and UE-specific CIO adaptation and offloading according to this disclosure.

FIG. 5 illustrates a workflow diagram of another example process for measurement reporting and UE-specific CIO adaptation and offloading according to this disclosure. The process 500 may be performed in the Hetnet 100, Hetnet 200, or any other suitable system. Many of the operations of the process 500 are the same as or similar to corresponding operations of the process 400. Detailed descriptions of these operations will not be repeated here.

At operation 501, the RNC transmits a measurement control message to the UE to configure one or more measurements to be performed by the UE. At operation 503, the UE performs the one or more measurements.

At operation 505, after an occurrence of a trigger event, the UE transmits a measurement report to the RNC. Like the measurement report transmitted in operation 405 in FIG. 4, the transmission of the measurement report in operation 505 is event-triggered. However, the trigger event and the contents of the measurement report in operation 505 are different than in operation 405. Here, the trigger event is an enhanced event 1D, and the measurement report is defined as an enhanced event 1D report.

The enhanced event 1D takes into consideration a measurement for link level performance of the data channel, e.g., a long term CQI, instead of the traditional event 1D measurements, such as RSRP and Ec/No. However, in some embodiments, the reported measurements can include legacy measurements, such as RSCP and Ec/No, in addition to long term CQI.

The format of the enhanced event 1D measurement report can reuse the format of the legacy measurement report. Although the format of the enhanced event 1D measurement report is similar to a legacy report, the enhanced event 1D report is defined as a different type of report so that the network is aware that this event is triggered by a different event-triggering condition (i.e., a long term CQI based enhanced event 1D), not by the traditional triggering condition (i.e., the RSCP based event 1D). Additionally, a CIO value can also be reported to the network in the measurement report.

Once the new measurement report is received, the RNC evaluates the measurement data in the measurement report and determines whether to offload the UE. This can include the following operations.

At operation 507, the RNC knows that the trigger condition for the enhanced event 1D is met. Based on this, the RNC knows that the difference between the link level performance before and after offloading is within the range of a predetermined threshold (Threshold2).

At operation 509, the RNC evaluates how much (or how many) scheduling resources can be gained once the UE is offloaded from the overloaded serving cell to a lightly loaded candidate neighbor cell. At operation 511, the RNC decides whether to offload the UE to a candidate cell. If the RNC decides to offload the UE to the candidate cell, either operation 513 (CIO adaptation signaling is triggered) or operation 515 (offloading procedure is initiated directly) is performed.

In some embodiments, the UE is configured to report a capability to receive control channels and/or data channels. This capability is reported to the RNC and is reported separately from the measurement report. This capability can be defined in different ways. In one example, the UE capability can be defined as a maximum difference between the serving cell RSCP (or Ec/No) and the strongest neighbor cell RSCP (or Ec/No) that can be supported based on the UE capability to receive control channels and/or data channels while maintaining a certain desired performance. In another example, the UE capability can be defined as a minimum geometry value that can be supported based on the UE capability to receive control channels and/or data channels while maintaining a certain desired performance. In yet another example, the UE capability can be defined as a minimum Ec/No value that can be supported based on the UE capability to receive control channels and/or data channels while maintaining a certain desired performance. In still another example, the UE capability can be defined as a maximum CIO value that can be supported based on the UE capability to receive control channels and/or data channels while maintaining a certain desired performance.

In some embodiments, the UE may report the capability to receive control channels and/or data channels as part of the process 500. For example, at operation 505, when the enhanced event 1D trigger event is satisfied, the measurement report is transmitted as described above. However, when the enhanced event 1D trigger event is not satisfied, the UE can report the capability to receive control channels and/or data channels. In some embodiments, this reporting can occur when the enhanced event 1D trigger event is not satisfied for the first time after the UE has changed its serving cell, or after a certain period of time from the last serving cell change.

In other embodiments, the UE may report the capability to receive control channels and/or data channels in response to the network sending a triggering condition or request to the UE to report its capability. The UE sends the UE capability report to the network when the triggering condition is satisfied.

Figure 6:
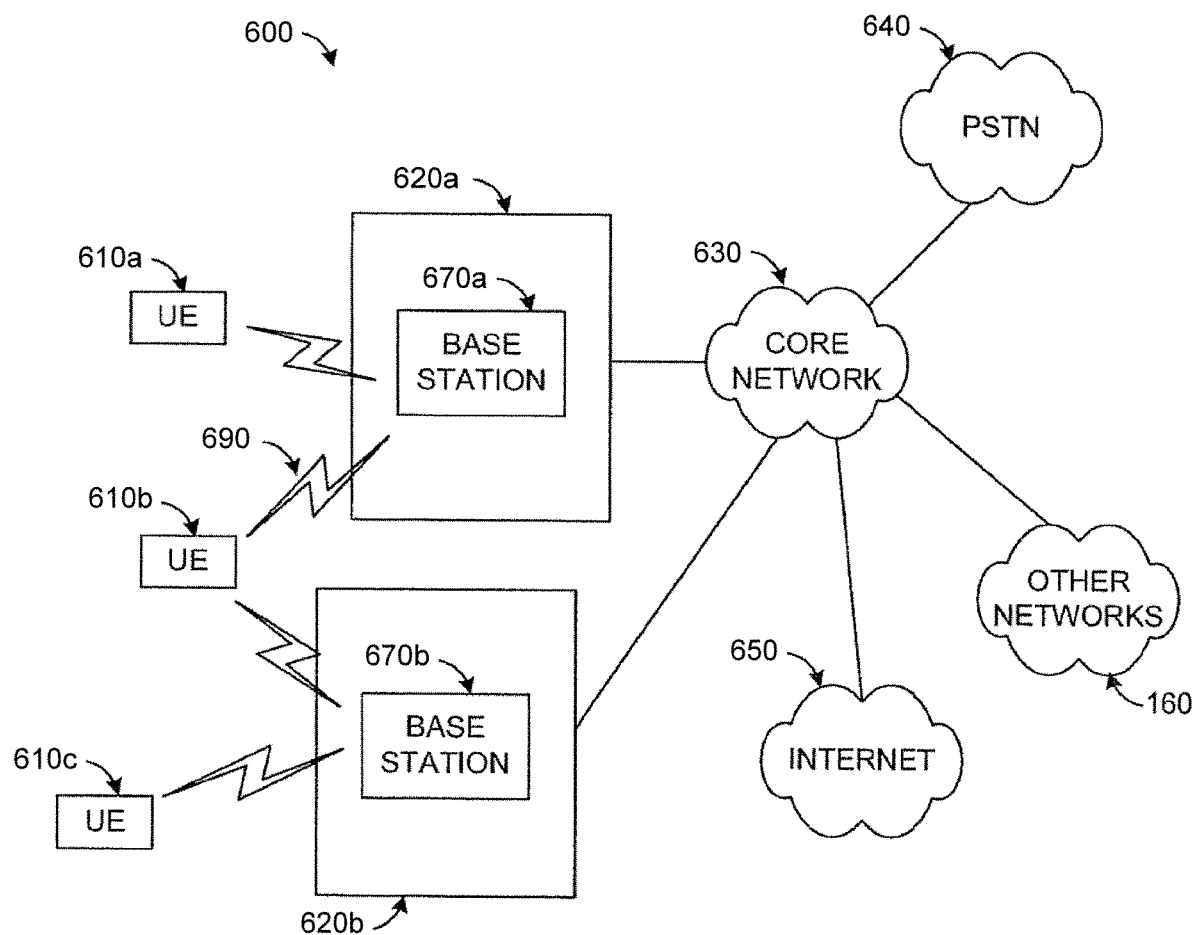
FIG. 6 illustrates an example communication system that may be used for implementing the devices and methods disclosed herein.

FIG. 6 illustrates an example communication system 600 that may be used for implementing the devices and methods disclosed herein. In general, the system 600 enables multiple wireless users to transmit and receive data and other content. The system 600 may implement one or more channel access methods, such as code division multiple access (CDMA), time division multiple access (TDMA), frequency division multiple access (FDMA), orthogonal FDMA (OFDMA), or single-carrier FDMA (SC-FDMA). In some embodiments, the system 600 may represent (or by represented by) the Hetnet systems 100 and 200 shown in FIGS. 1 and 2.

In this example, the communication system 600 includes user equipment (UE) 610a-610c, radio access networks (RANs) 620a-620b, a core network 630, a public switched telephone network (PSTN) 640, the Internet 650, and other networks 660. While certain numbers of these components or elements are shown in FIG. 6, any number of these components or elements may be included in the system 600.

The UEs 610a-610c are configured to operate and/or communicate in the system 600. For example, the UEs 610a-610c are configured to transmit and/or receive wireless signals or wired signals. Each UE 610a-610c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 620a-620b here include base stations 670a-670b, respectively. Each base station 670a-670b is configured to wirelessly interface with one or more of the UEs 610a-610c to enable access to the core network 630, the PSTN 640, the Internet 650, and/or the other networks 660. For example, the base stations 670a-670b may include one or more of several well-known devices, such as a base transceiver station (BTS), a Node-B (NodeB), an evolved NodeB (eNodeB), a Home NodeB, a Home eNodeB, a site controller, an access point (AP), or a wireless router, or a server, router, switch, or other processing entity with a wired or wireless network.

In the embodiment shown in FIG. 6, the base station 670a forms part of the RAN 620a, which may include other base stations, elements, and/or devices. Also, the base station 670b forms part of the RAN 620b, which may include other base stations, elements, and/or devices. Each base station 670a-670b operates to transmit and/or receive wireless signals within a particular geographic region or area, sometimes referred to as a "cell." In some embodiments, multiple-input multiple-output (MIMO) technology may be employed having multiple transceivers for each cell.

The base stations 670a-670b communicate with one or more of the UEs 610a-610c over one or more air interfaces 690 using wireless communication links. The air interfaces 690 may utilize any suitable radio access technology.

It is contemplated that the system 600 may use multiple channel access functionality, including such schemes as described above. In particular embodiments, the base stations and UEs are configured to implement the Long Term Evolution wireless communication standard (LTE), LTE Advanced (LTE-A), and/or LTE Broadcast (LTE-B). Of course, other multiple access schemes and wireless protocols may be utilized.

The RANs 620a-620b are in communication with the core network 630 to provide the UEs 610a-610c with voice, data, application, Voice over Internet Protocol (VoIP), or other services. Understandably, the RANs 620a-620b and/or the core network 630 may be in direct or indirect communication with one or more other RANs (not shown). The core network 630 may also serve as a gateway access for other networks (such as PSTN 640, Internet 650, and other networks 660). In addition, some or all of the UEs 610a-610c may include functionality for communicating with different wireless networks over different wireless links using different wireless technologies and/or protocols. In addition, some or all of the UEs 610a-610c and the base stations 670a-670b are configured for performing operations for measurement reporting and UE-specific CIO adaptation and offloading according to this disclosure, such as the processes 400 and 500 shown in FIGS. 4 and 5.

Although FIG. 6 illustrates one example of a communication system, various changes may be made to FIG. 6. For example, the communication system 600 could include any number of UEs, base stations, networks, or other components in any suitable configuration.

Figure 7A:
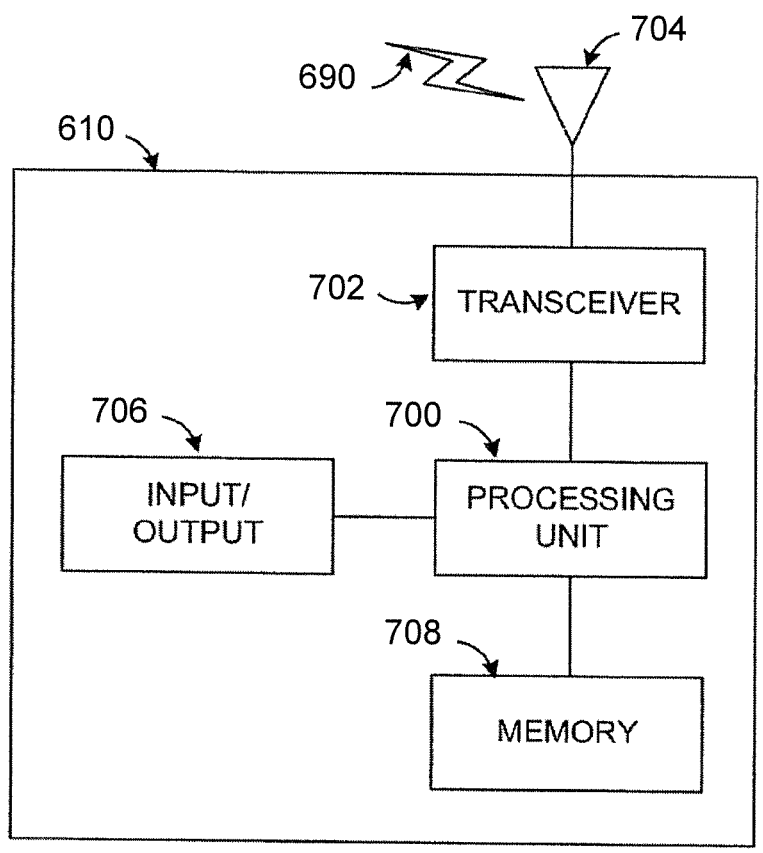
FIGS. 7A and 7B illustrate example devices that may be used for implementing the methods and teachings disclosed herein.
Figure 7B:
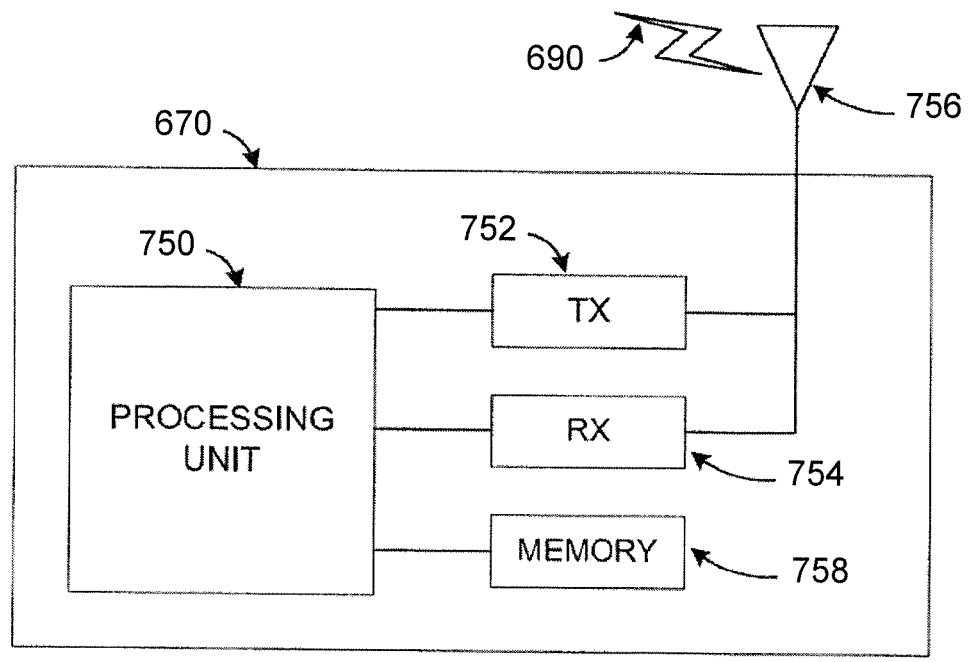

FIGS. 7A and 7B illustrate example devices that may implement the methods and teachings according to this disclosure. In particular, FIG. 7A illustrates an example UE 610, and FIG. 7B illustrates an example base station 670. These components could be used in the system 600, the Hetnet systems 100 and 200, or in any other suitable system. These components could be used to perform operations for measurement reporting and UE-specific CIO adaptation and offloading according to this disclosure, such as the processes 400 and 500 shown in FIGS. 4 and 5.

As shown in FIG. 7A, the UE 610 includes at least one processing unit 700. The processing unit 700 implements various processing operations of the UE 610. For example, the processing unit 700 could perform signal coding, data processing, power control, input/output processing, or any other functionality enabling the UE 610 to operate in the system 600. The processing unit 700 also supports the methods and teachings described in more detail above. Each processing unit 700 includes any suitable processing or computing device configured to perform one or more operations. Each processing unit 700 could, for example, include a microprocessor, microcontroller, digital signal processor, field programmable gate array, or application specific integrated circuit.

The UE 610 also includes at least one transceiver 702. The transceiver 702 is configured to modulate data or other content for transmission by at least one antenna 704. The transceiver 702 is also configured to demodulate data or other content received by the at least one antenna 704. Each transceiver 702 includes any suitable structure for generating signals for wireless transmission and/or processing signals received wirelessly. Each antenna 704 includes any suitable structure for transmitting and/or receiving wireless signals. One or multiple transceivers 702 could be used in the UE 610, and one or multiple antennas 704 could be used in the UE 610. Although shown as a single functional unit, a transceiver 702 could also be implemented using at least one transmitter and at least one separate receiver.

The UE 610 further includes one or more input/output devices 706. The input/output devices 706 facilitate interaction with a user. Each input/output device 706 includes any suitable structure for providing information to or receiving information from a user, such as a speaker, microphone, keypad, keyboard, display, or touch screen.

In addition, the UE 610 includes at least one memory 708. The memory 708 stores instructions and data used, generated, or collected by the UE 610. For example, the memory 708 could store software or firmware instructions executed by the processing unit(s) 700 and data used to reduce or eliminate interference in incoming signals. Each memory 708 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 7B, the base station 670 includes at least one processing unit 750, at least one transmitter 752, at least one receiver 754, one or more antennas 756, and at least one memory 758. The processing unit 750 implements various processing operations of the base station 670, such as signal coding, data processing, power control, input/output processing, or any other functionality. The processing unit 750 can also support the methods and teachings described in more detail above. Each processing unit 750 includes any suitable processing or computing device configured to perform one or more operations. Each processing unit 750 could, for example, include a microprocessor, microcontroller, digital signal processor, field programmable gate array, or application specific integrated circuit.

Each transmitter 752 includes any suitable structure for generating signals for wireless transmission to one or more UEs or other devices. Each receiver 754 includes any suitable structure for processing signals received wirelessly from one or more UEs or other devices. Although shown as separate components, at least one transmitter 752 and at least one receiver 754 could be combined into a transceiver. Each antenna 756 includes any suitable structure for transmitting and/or receiving wireless signals. While a common antenna 756 is shown here as being coupled to both the transmitter 752 and the receiver 754, one or more antennas 756 could be coupled to the transmitter(s) 752, and one or more separate antennas 756 could be coupled to the receiver(s) 754. Each memory 758 includes any suitable volatile and/or non-volatile storage and retrieval device(s).

Additional details regarding UEs 610 and base stations 670 are known to those of skill in the art. As such, these details are omitted here for clarity.

In another embodiment, a network entity sends information to the UE so that the UE would determine at least one candidate serving cell and the HS-DPCCH format to be used upon receiving the information. If the network entity is RNC, then the information can be delivered via RRC signaling. If the network entity is NodeB, then the information can be delivered via physical layer signaling, e.g., HS-SCCH order. The information can consist of at least one candidate serving cell, and the indication of HS-DPCCH format.

Upon reception of the information sent from the network entity, the UE would derive the link measurement quantities from the serving cell and the candidate serving cell(s) informed by the network entity. The link measurement quantities will be sent from the UE to the NodeB via HS-DPCCH with a certain type of HS-DPCCH format. If there is only one candidate serving cell, one example of the HS-DPCCH format is SF-DC (Single Frequency-Dual Cell) format. As an example, in this format, the link measurement quantity of the serving cell is carried on the second slot in one HS-DPCCH subframe, and the link measurement quantity of the candidate serving cell is carried on the third slot in the HS-DPCCH subframe. The link measurement quantity of the serving cell should reflect the serving cell's downlink quality corresponding to a first specific period of time, e.g., the nearest downlink subframe based on the serving cell's pilot timing before the HS-DPCCH is transmitted in the uplink or a 3-slot reference period ending 1 slot before the start of the first slot in which the reported CQI value is transmitted. The link measurement quantity of the candidate serving cell should reflect the candidate serving cell's downlink quality corresponding to a second specific period of time, e.g., the nearest downlink subframe based on the candidate serving cell's pilot timing before the HS-DPCCH is transmitted in the uplink or a 3-slot reference period ending 1 slot before the start of the first slot in which the reported CQI value is transmitted. The first specific period of time and the second specific period of time could be either the same or not the same.

NodeB filters the link measurement quantities reported by the UE. NodeB reports the filtered link measurement quantities of the UE to the RNC via Iub signaling.

Based on the received filtered link measurement quantities associated to a UE, RNC determines the new serving cell to transmit data to the UE.

RNC offloads the UE to the new serving cell. RNC notifies a NodeB (the serving cell or the new serving cell) to send a physical layer signaling including new serving cell indicator to the UE. Upon receiving the physical layer signaling, the UE configures the new serving cell as its new serving cell. NodeB could also send an indication to the UE so that the UE chooses the proper HS-DPCCH format, e.g., a format consists of multiple link measurement quantities, or the format consists of only the link measurement quantity from the new serving cell.

RNC sends the downlink data to the new serving cell, and the new serving cell sends the data to the UE.

Another embodiment of the solution for the offloading procedure can be performed as following:

A network entity sends information to the UE so that the UE would monitor and decode the data from current serving cell and the candidate serving cell for offloading. If the network entity is RNC, then the information can be delivered via RRC signaling. If the network entity is NodeB, then the information can be delivered via physical layer signaling, e.g., HS-SCCH order. The information can consist of at least one candidate serving cell.

Upon reception of the information sent from the network entity, the UE would derive the link measurement quantities from the serving cell and the candidate serving cell(s) informed by the network entity. The link measurement quantities will be sent from the UE to the NodeB via HS-DPCCH with a certain type of HS-DPCCH format. If there is only one candidate serving cell, one example of the HS-DPCCH format is SF-DC (Single Frequency-Dual Cell) format. As an example, in this format, the link measurement quantity of the serving cell is carried on the second slot in one HS-DPCCH subframe, and the link measurement quantity of the candidate serving cell is carried on the third slot in the HS-DPCCH subframe. The link measurement quantity of the serving cell should reflect the serving cell's downlink quality corresponding to a first specific period of time, e.g., the nearest downlink subframe based on the serving cell's pilot timing before the HS-DPCCH is transmitted in the uplink or a 3-slot reference period ending 1 slot before the start of the first slot in which the reported CQI value is transmitted. The link measurement quantity of the candidate serving cell should reflect the candidate serving cell's downlink quality corresponding to a second specific period of time, e.g., the nearest downlink subframe based on the candidate serving cell's pilot timing before the HS-DPCCH is transmitted in the uplink or a 3-slot reference period ending 1 slot before the start of the first slot in which the reported CQI value is transmitted. The first specific period of time and the second specific period of time could be either the same or not the same.

NodeB filters the link measurement quantities reported by the UE. NodeB reports the filtered link measurement quantities of the UE to the RNC via Iub signaling.

RNC sends the downlink data to either the original serving cell or the candidate serving cell for offloading according to the received filtered CQI and the load status on these two cells. Either one of the two cells will send the received data to the UE accordingly when the UE's data arrives.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for user equipment (UE) offloading, the method comprising:
   receiving, at a network controller, a measurement report from a UE, the measurement report comprising a long term channel quality indicator (LCQI) estimate for a serving cell that is currently serving the UE and one or more LCQI estimates for one or more candidate cells that are non-serving cells of the UE;
   determining, at the network controller, to offload the UE from the serving cell to a candidate cell of the one or more candidate cells when a difference between the LCQI estimate for the serving cell and a LCQI estimate for the candidate cell of the one or more candidate cells is within a range of a predetermined threshold, and when traffic load of the candidate cell is lighter than traffic load of the serving cell; and
   offloading the UE to the candidate cell, wherein offloading the UE to the candidate cell comprises one of:
      configuring a cell individual offset (CIO) on the UE through radio resource control (RRC) signaling;
      triggering an offloading procedure through RRC signaling; or
      triggering the offloading procedure through physical layer signaling.

2. The method of claim 1, wherein the measurement report further includes one or received signal code powers (RSCPs) and received signal strength indicators (RSCPs/RSSIs).

3. The method of claim 1, wherein the measurement report includes at least one measurement quantity indicating a difference between a link quality for the candidate cell and a link quality for the serving cell.

4. The method of claim 1, wherein the LCQI estimate for the serving cell and the one or more LCQI estimates for the one or more candidate cells in the measurement report are filtered LCQI values.

5. The method of claim 1, wherein the serving cell is served by a NodeB and the candidate cell is served by a low power node (LPN).

6. The method of claim 1, wherein the serving cell and the candidate cell are served by the same NodeB or by different NodeBs.

7. The method of claim 1, wherein the measurement report by the UE is triggered by an occurrence of an event 1D.

8. The method of claim 1, wherein the measurement report is transmitted by the UE periodically according to a predetermined schedule.

9. The method of claim 1, further comprising transmitting a measurement control message to the UE to configure one or more measurements to be performed by the UE on a link quality of the one or more candidate cells.

10. The method of claim 1, wherein the measurement report by the UE is triggered by an occurrence of an enhanced event 1D.

11. The method of claim 10, wherein the enhanced event 1D comprises a determination of a difference value between radio link performance of the serving cell and one of the candidate cells, and a comparison of the difference value with a first predetermined threshold to determine to trigger the enhanced event 1D.

12. The method of claim 10, wherein the enhanced event 1D is configured with a first predetermined threshold for radio link performance.

13. The method of claim 1, wherein a list of candidate cells is indicated to the UE to perform radio link measurements.

14. A method for user equipment (UE) offloading at a UE, the method comprising:
    performing, by the UE, long term channel quality indicators (LCQI) estimates to obtain a LCQI for a serving cell currently serving the UE and one or more LCQIs for one or more candidate cells that are non-serving cells of the UE and that are candidates for offloading the UE from the serving cell;
    transmitting, by the UE triggered by an enhanced event 1D, a measurement report to a network controller, the measurement report comprising the LCQI for the serving cell and the one or more LCQIs for the one or more candidate cells, and the enhanced event 1D occurring when a difference between the LCQI for the serving cell and a LCQI for a candidate cell of the one or more candidate cells is within a range of a predetermined threshold; and
    receiving, by the UE from the network controller after transmitting the measurement report, signaling for offloading from the serving cell to the candidate cell, with the candidate cell having lighter traffic load than the serving cell, wherein the signaling comprises one of:
        radio resource control (RRC) signaling configuring a cell individual offset (CIO) on the UE;
        RRC signaling triggering an offloading procedure; or
        physical layer signaling triggering the offloading procedure.

15. The method of claim 14, wherein the measurement report further includes received signal code powers (RSCPs) and received signal strength indicators (RSCPs/RSSIs).

16. The method of claim 14, wherein the measurement report includes estimated LCQI difference values based on differences between a LCQI for each candidate cell and the LCQI for the serving cell.

17. The method of claim 14, wherein the serving cell is served by a NodeB and the candidate cell is served by a low power node (LPN).

18. The method of claim 14, wherein the candidate cell is served by the same NodeB that serves the serving cell.

19. The method of claim 14, wherein the measurement report is further transmitted by the UE in response to an occurrence of an event 1D.

20. The method of claim 14, wherein the measurement report is further transmitted by the UE periodically according to a predetermined schedule.

21. The method of claim 14, further comprising receiving a measurement control message from the network controller, wherein the UE performs the LCQI estimates in response to receiving the measurement control message.

22. The method of claim 14, wherein the enhanced event 1D comprises a determination of a difference value between radio link performance of the serving cell and the candidate cell, and a comparison of the difference value with a threshold to determine to trigger the enhanced event 1D.

23. The method of claim 14, wherein the enhanced event 1D is configured with a first predetermined threshold for radio link performance.

24. The method of claim 14, wherein an information element (IE) is used to indicate a list of candidate cells to the UE.

25. A network controller apparatus configured for user equipment (UE) offloading, the network controller apparatus comprising:
    at least one memory; and
    at least one processor coupled to the at least one memory, the at least one processor configured to:
    receive a measurement report from a UE, the measurement report comprising a long term channel quality indicator (LCQI) estimate for a serving cell that is currently serving the UE and one or more LCQI estimates for one or more candidate cells that are non-serving cells of the UE;
    determine to offload the UE from the serving cell to a candidate cell of the one or more candidate cells when a difference between the LCQI estimate for the serving cell and a LCQI estimate for the candidate cell of the one or more candidate cells is within a range of a predetermined threshold, and when traffic load of the candidate cell is lighter than traffic load of the serving cell;
    offload the UE to the candidate cell, wherein offloading the UE to the candidate cell comprises one of:
        configuring a cell individual offset (CIO) on the UE through radio resource control (RRC) signaling;
        triggering an offloading procedure through RRC signaling; or
        triggering the offloading procedure through physical layer signaling.

26. A user equipment (UE) apparatus configured for UE offloading, the apparatus comprising:
    at least one memory; and
    at least one processor coupled to the at least one memory, the at least one processor configured to:
    perform long term channel quality indicators (LCQI) estimates to obtain a LCQI for a serving cell currently serving the UE, and one or more LCQIs for one or more candidate cells that are non-serving cells of the UE and that are candidates for offloading the UE from the serving cell;
    transmit a measurement report to a network controller when a difference between the LCQI for the serving cell and a LCQI for a candidate cell of the one or more candidate cells is within a range of a predetermined threshold, the measurement report comprising the LCQI for the serving cell and the one or more LCQIs for the one or more candidate cells; and
    receive, from the network controller after transmitting the measurement report, signaling for offloading from the serving cell to the candidate cell, with the candidate cell having lighter traffic load than the serving cell, wherein the signaling comprises one of:
        radio resource control (RRC) signaling configuring a cell individual offset (CIO) on the UE;
        RRC signaling triggering an offloading procedure; or
        physical layer signaling triggering the offloading procedure.

27. A method comprising:
  receiving, by a user equipment (UE), a measurement control message from a network controller configuring the UE to estimate long term channel quality indicators (LCQIs) for a serving cell currently serving the UE and for one or more candidate cells that are non-serving cells of the UE and that are candidates for offloading the UE from the serving cell;
  measuring, by the UE, a first LCQI for a candidate cell in the one or more candidate cells and a second LCQI for the serving cell in response to receiving the measurement control message;
  transmitting, by the UE when a difference between the first LCQI and the second LCQI is within a range of a predetermined threshold, a capability report to the network controller, the capability report comprising the first LCQI and the second LCQI; and
  receiving, by the UE from the network controller after transmitting the capability report, signaling for offloading from the serving cell to the candidate cell, with the candidate cell having lighter traffic load than the serving cell, wherein the signaling comprises one of:
    radio resource control (RRC) signaling configuring a cell individual offset (CIO) on the UE;
    RRC signaling triggering an offloading procedure; or
    physical layer signaling triggering the offloading procedure.

28. The method of claim 27, wherein the capability report indicates a capability of the UE to receive control channels and/or data channels.

29. The method of claim 13, wherein the list is sent to the UE via RRC signaling or physical layer signaling.

30. The method of claim 1, wherein the LCQI for the serving cell and the one or more LCQI estimates for the one or more candidate cells are carried on an uplink HS-DPCCH.

31. The method of claim 30, wherein the network controller configures a HS-DPCCH format and a HS-DPCCH power to carry LCQI estimates for the serving cell and the one or more candidate cells.

32. The method of claim 31, wherein the measurement report further comprising:
  a measurement quantity of the serving cell associated to a downlink quality in a time period, wherein the time period is a nearest downlink subframe based on a serving cell's pilot timing before transmission of the uplink HS-DPCCH; and
  a measurement quantity of at least one of the candidate cells associated to a downlink quality in a time period, wherein the time period is a nearest downlink subframe based on a candidate serving cell's pilot timing before transmission of the uplink HS-DPCCH.

33. The method of claim 1, wherein a NodeB is configured to send LCQI estimates for the serving cell and at least one of the candidate cells to the network controller via Iub signaling.

34. The method of claim 1, further comprising configuring the UE to activate or deactivate reporting of LCQI estimates.

35. The method of claim 1, wherein the measurement report includes estimated LCQI difference values each of which is based on a difference between a LCQI estimate for each candidate cell and the LCQI estimate for the serving cell.

36. The method of claim 14, further comprising receiving, by the UE, a measurement control message from the network controller, wherein the measurement control message comprises configuration information for the UE to estimate LCQIs of the candidate cells after interference cancellation.

37. The method of claim 1, further comprising sending, by the network controller, a measurement control message to the UE, wherein the measurement control message comprises configuration information for the UE to estimate LCQIs of the one or more candidate cells after interference cancellation.

38. The method of claim 27, further comprising:
  before transmitting the capability report, determining at least one of:
    a maximum difference between a received signal code power (RSCP) of the serving cell and the RSCP of a strongest neighbor cell;
    a minimum geometry value that can be supported by the UE to receive control channels and/or data channels;
    a minimum energy per chip over noise (Ec/No) value that can be supported by the UE to receive control channels and/or data channels; or
    a maximum cell individual offset (CIO) value that can be supported.

39. The method of claim 38, wherein the capability report comprises at least one of the maximum difference, the minimum geometry value, the minimum Ec/No value, or the maximum CIO value.

* * * * *